United States Patent
Chen

(10) Patent No.: US 9,131,562 B2
(45) Date of Patent: *Sep. 8, 2015

(54) HIGH EFFICIENCY LED DRIVER AND DRIVING METHOD THEREOF

(71) Applicant: Silergy Semiconductor Technology (Hangzhou) LTD, Hangzhou, ZheJiang Province (CN)

(72) Inventor: Wei Chen, Saratoga, CA (US)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/467,344

(22) Filed: Aug. 25, 2014

(65) Prior Publication Data

US 2014/0361702 A1    Dec. 11, 2014

Related U.S. Application Data

(63) Continuation of application No. 13/723,666, filed on Dec. 21, 2012, now Pat. No. 8,860,325.

(30) Foreign Application Priority Data

Jan. 11, 2012    (CN) .......................... 2012 1 0006803

(51) Int. Cl.
*H05B 37/02*    (2006.01)
*H05B 33/08*    (2006.01)

(52) U.S. Cl.
CPC ........ *H05B 33/0809* (2013.01); *H05B 33/0812* (2013.01); *H05B 37/02* (2013.01)

(58) Field of Classification Search
CPC .. H05B 37/02; H05B 37/029; H05B 33/0815; H05B 33/0803; H05B 33/0842; H05B 33/0812; H05B 33/0809; H05B 33/0836; H05B 41/2828; H05B 41/34; Y02B 20/342; Y02B 20/345; Y02B 20/347
USPC ....... 315/169.1, 127, 200 R, 227 R, 224, 247, 315/291, 294, 297, 307, 312; 345/46, 82, 345/204, 212

See application file for complete search history.

(56) References Cited

U.S. PATENT DOCUMENTS

| 6,724,376 | B2 | 4/2004 | Aakura et al. | |
| 8,115,536 | B2* | 2/2012 | Snelten | 327/538 |
| 8,217,588 | B2 | 7/2012 | McKinney | |
| 8,339,063 | B2* | 12/2012 | Yan et al. | 315/291 |
| 8,421,424 | B2* | 4/2013 | Ishii | 323/222 |
| 8,773,041 | B2* | 7/2014 | Chen | 315/291 |
| 8,860,325 | B2* | 10/2014 | Chen | 315/291 |

(Continued)

*Primary Examiner* — Haissa Philogene
(74) *Attorney, Agent, or Firm* — Michael C. Stephens, Jr.

(57) ABSTRACT

The present invention relates to a high efficiency LED driver and driving method thereof. In one embodiment, a high efficiency LED driving method configured for a LED device can include: (i) receiving a DC bus voltage and generating a driving voltage for the LED device through a power switch; (ii) comparing the DC bus voltage against a sum of the driving voltage and a first reference voltage; (iii) where when the DC bus voltage is greater than the sum of the driving voltage and the first reference voltage, generating a first output current; (iv) where when the DC bus voltage is greater than the driving voltage and less than the sum of the driving voltage and the first reference voltage, generating a second output current; and (v) matching an average current of the first output current and the second output current with a corresponding driving current.

8 Claims, 7 Drawing Sheets

(56) References Cited

U.S. PATENT DOCUMENTS

| | | |
|---|---|---|
| 2012/0126712 A1 | 5/2012 | Kim |
| 2012/0217888 A1 | 8/2012 | Chang et al. |
| 2013/0033194 A1 | 2/2013 | Kang et al. |
| 2013/0175936 A1* | 7/2013 | Chen ........................ 315/200 R |
| 2013/0181626 A1 | 7/2013 | Chen |
| 2013/0313989 A1 | 11/2013 | Chen |

* cited by examiner

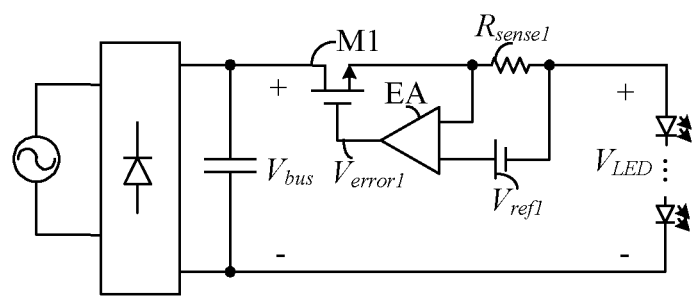
FIG. 1A (conventional)

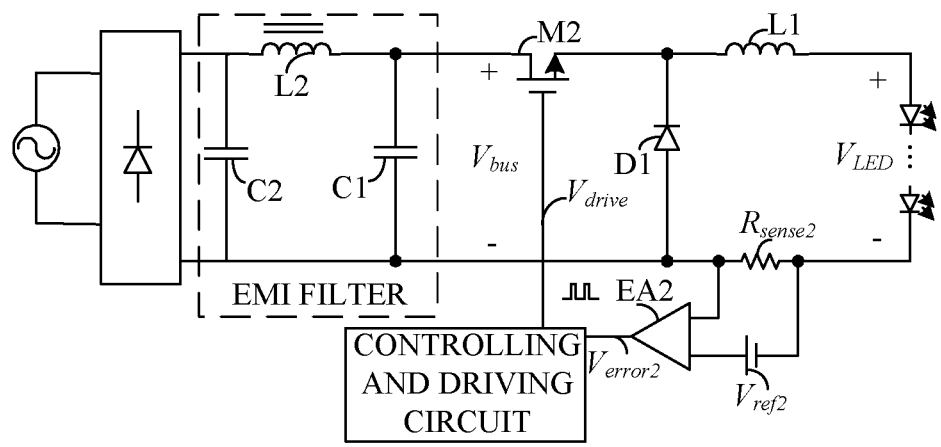
FIG. 1B (conventional)

HIGH EFFICIENCY LED DRIVER AND DRIVING METHOD THEREOF

RELATED APPLICATIONS

This application is a continuation of the following application, U.S. patent application Ser. No. 13/723,666, filed on Dec. 21, 2012, now issued as U.S. Pat. No. 8,860,325, and which is hereby incorporated by reference as if it is set forth in full in this specification, and which also claims the benefit of Chinese Patent Application No. 201210006803.9, filed on Jan. 11, 2012, which is incorporated herein by reference in its entirety.

FIELD OF THE INVENTION

The present invention relates to the field of semiconductor technology, and more specifically to a high efficiency light-emitting diode (LED) driver, and driving methods thereof.

BACKGROUND

Along with increasing innovation and development in the illumination industry, and increasing importance of energy savings, light-emitting diode (LED) lighting technology is developing fast as a revolutionary lighting technology. Because the luminance of LEDs is related to the luminous intensity, which is proportional to the current and forward voltage of LEDs, and may change due to temperature variation, a constant current source may be utilized for driving LEDs. Thus, to achieve a good reliability and a good luminous intensity, an appropriate LED driver is an important part of the overall design. Without a good LED driver, inherent advantages of LED technology may not be fully realized.

SUMMARY

In one embodiment, a high efficiency light-emitting diode (LED) driving method configured for a LED device can include: (i) receiving a DC bus voltage, where the DC bus voltage can be obtained by rectifying an AC input voltage; (ii) generating a driving voltage for the LED device through a power switch; (iii) comparing the DC bus voltage against a sum of the driving voltage and a first reference voltage; (iv) where when the DC bus voltage is greater than the sum of the driving voltage and the first reference voltage, controlling the power switch to generate a first output current; (v) where when the DC bus voltage is greater than the driving voltage and less than the sum of the driving voltage and the first reference voltage, controlling the power switch to generate a second output current; and (vi) matching an average current of the first output current and the second output current with a corresponding driving current of the LED device.

In one embodiment, a high efficiency LED driver can include: (i) a power switch configured to receive a DC bus voltage, and to generate a driving voltage and a driving current for a LED device; (ii) a first comparator configured to compare the DC bus voltage against a sum of the driving voltage and a first reference voltage to generate a first controlling signal; (iii) a controlling and driving circuit coupled to the first comparator and configured to receive the first controlling signal and an LED current sampling signal; (iv) where when the DC bus voltage is greater than the driving voltage and less than the sum of the driving voltage and the first reference voltage, the first controlling signal is configured to control the controlling and driving circuit to operate in a second operation mode, the power switch being configured to generate a second output current; and (v) where when the DC bus voltage is greater than the sum of the driving voltage and the first reference voltage, the first controlling signal is configured to control the controlling and driving circuit to operate in a first operation mode, the power switch is configured to generate a first output current according to the LED current sampling signal, and the first output current is adjustable to maintain an average current of the first output current and the second output current to match with a corresponding driving current of the LED device.

Embodiments of the present invention can advantageously provide several advantages over conventional approaches. For example, a high efficiency LED driving method configured for an LED device can adjust the output current according to the relationship of input voltage and driving voltage. Also, when the input voltage is relatively high, the output current can be minimized to satisfy driving requirements. Also, when the input voltage is relatively small, the conduction voltage drop can be reduced while the output current can be relatively higher. Therefore, in both situations, power losses can be reduced to achieve higher operating efficiency. Also, the circuit structure can be simplified to lower overall product cost and circuit size. Other advantages of the present invention may become readily apparent from the detailed description of preferred embodiments below.

BRIEF DESCRIPTION OF THE DRAWINGS

FIG. 1A is a schematic diagram of an example conventional LED driver using a linear regulator.

FIG. 1B is a schematic diagram of an example conventional LED driver using a switching regulator.

DETAILED DESCRIPTION

Figure 2A:
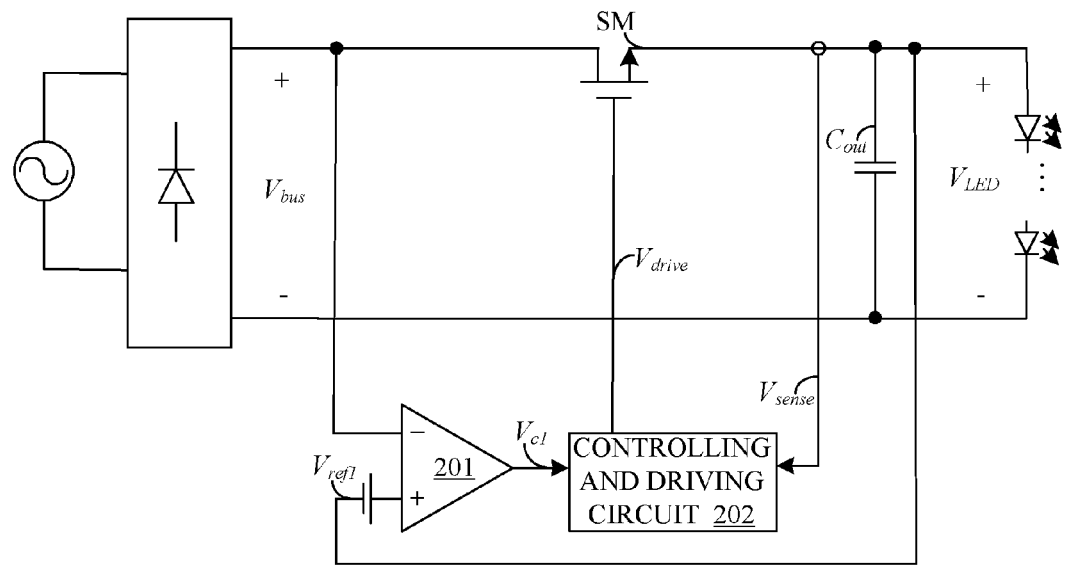
FIG. 2A is a schematic diagram of a first example high efficiency LED driver in accordance with embodiments of the present invention.

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Traditionally, there are two types of power regulators for driving light-emitting diodes (LEDs): linear regulators and switching regulators. In FIG. 1A, shown is a schematic diagram of an example conventional LED driver using linear regulator. The LED driver can include first power switch M1, error amplifier EA, and sampling resistor $R_{sense1}$. The output current of power switch M1 can be detected by sampling resistor $R_{sense1}$, the detected value can be compared with reference voltage $V_{ref1}$, and the error between the detected value and reference voltage $V_{ref1}$ can be amplified by error amplifier EA to obtain error signal $V_{error1}$. Power switch M1 can be used to receive DC bus voltage $V_{bus}$ and error signal $V_{error1}$, and to generate a nearly constant output voltage and a nearly constant output current to drive LEDs.

By utilising a linear regulator, the example LED driver may have an easier circuit structure with fewer components to reduce the product cost. However, the efficiency of the LED driver may be sacrificed. For example, if the LED driver is configured in a universal input AC voltage with a range of from about 90V to about 265V, the rectified DC bus voltage may range from about 120V to about 375V. Thus, the driving voltage for LEDs should be lower than a minimum DC bus voltage (e.g., about 120V), and when the input AC voltage is about 265V (or the DC bus voltage is about 375V), the power losses can be substantial, and can result in an efficiency lower than about 35%.

FIG. 1B shows a schematic diagram of an example conventional LED driver using switching regulator. In this example, power switch M2, inductor L1, and diode D1 can be used to form a buck topology. The LED current can be detected by sampling resistor $R_{sense2}$, and the detected value can be used to compare against a reference voltage $V_{ref2}$. Error signal $V_{error2}$ can be obtained according to the detected value and reference voltage $V_{ref2}$. A controlling and driving circuit can be used to receive error signal $V_{error2}$, and to generate a driving signal for power switch M2.

Power switch M2 can be controlled to output an almost constant output voltage and an almost constant output current to drive LEDs. The advantage of this type of LED driver is that the efficiency is close to 100% in theory if the conduction losses in power switch M2 and the magnetic components (e.g., inductor L1) are neglected. However, because the operating frequency of switching regulator can be very high, an electromagnetic interference (EMI) filter may be utilized. Thus, one disadvantage is that more components are needed for this type LED driver than the linear regulator, increasing overall costs and circuitry size.

Embodiments of the present invention can advantageously provide several advantages over conventional approaches. For example, a high efficiency LED driving method configured for an LED device can adjust the output current according to the relationship of input voltage and driving voltage. Also, when the input voltage is relatively high, the output current can be minimized to satisfy driving requirements. Also, when the input voltage is relatively small, the conduction voltage drop can be reduced while the output current can be relatively higher. Therefore, in both situations, power losses can be reduced to achieve higher operating efficiency. Also, the circuit structure can be simplified to lower overall product cost and circuit size.

FIG. 2A shows a schematic diagram of a first example high efficiency LED driver in accordance with embodiments of the present invention. This example high efficiency LED driver can include power switch SM, output capacitor $C_{out}$, comparator 201, and controlling and driving circuit 202. Power switch SM can be coupled between a first terminal of DC bus voltage $V_{bus}$ and a first terminal of an LED device. Also, the DC bus voltage $V_{bus}$ can be obtained from the input AC voltage through a rectifier bridge.

Output capacitor $C_{out}$ can be parallel connected to the LED device, and coupled between the second power terminal of power switch SM and the second terminal of DC bus voltage $V_{bus}$ at its second terminal. Comparator 201 can receive DC bus voltage $V_{bus}$ at its inverting terminal, and a sum of driving voltage $V_{LED}$ and reference voltage $V_{ref1}$ at its non-inverting terminal, to generate first controlling signal $V_{c1}$. Controlling and driving circuit 202 can receive first controlling signal $V_{c1}$ and LED current sampling signal $V_{sense}$, and can generate driving signal $V_{drive}$ for power switch SM.

Figure 2B:
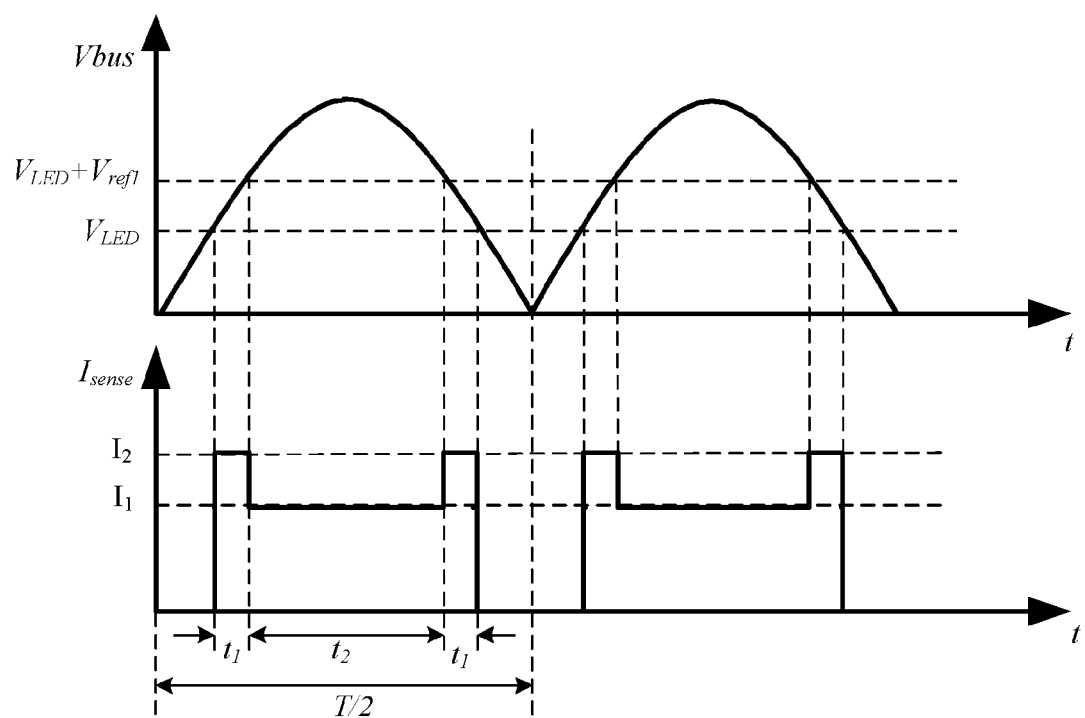
FIG. 2B is a waveform diagram of the example high efficiency LED driver shown in FIG. 2A.

FIG. 2B shows a waveform diagram of one example operation for the example high efficiency LED driver shown in FIG. 2A. The following describes an example operation process of the LED driver shown in FIG. 2A in detail in conjunction with the waveform diagram shown in FIG. 2B.

When DC bus voltage $V_{bus}$ is greater than driving voltage $V_{LED}$ but less than the sum of driving voltage $V_{LED}$ and reference voltage $V_{ref1}$, comparator 201 may output a high level first controlling signal $V_{c1}$ to controlling and driving circuit 202. Controlling and driving circuit 202 can receive first controlling signal $C_{C1}$ and LED current sampling signal $V_{sense}$ to generate driving signal $V_{drive}$ for power switch SM. Power switch SM can consequently be driven to produce second output current $I_2$ as substantially constant. In half switching cycle T/2, second output current $I_2$ can last for $2 \times t_1$.

When DC bus voltage $V_{bus}$ is greater than the sum of driving voltage $V_{LED}$ and reference voltage $V_{ref1}$, first comparator 201 may output a low level controlling signal $V_{C1}$ to controlling and driving circuit 202. Controlling and driving circuit 202 can receive first controlling signal $V_{c1}$ and LED current sampling signal $V_{sense}$ to generate driving signal $V_{drive}$ for power switch SM. Power switch SM can consequently be driven to produce first output current $I_1$ according to LED current sampling signal $V_{sense}$. In half switching cycle T/2, first output current $I_1$ can last for $t_2$.

When DC bus voltage $V_{bus}$ is less than driving voltage $V_{LED}$, the LED driver may stop working, so the output current of power switch SM may become zero. Through the above described operating process, the average value of first output current $I_1$ and second output current $I_2$ can satisfy the corresponding driving current of LED device by adjusting first output current $I_1$.

By adopting the LED driver in FIG. 2A, power switch SM may suffer from a minimum conduction voltage drop and the output current thereof may remain substantially constant when the DC bus voltage is relatively small. Otherwise, the output current of power switch SM can be minimized to satisfy the minimum driving current. Therefore, comparing to the traditional linear regulator in FIG. 1A, the efficiency of the LED driver in FIG. 2A can be largely improved.

In order to obtain even higher efficiency, first output current $I_1$ can set to be less than about 1% of the corresponding driving current of the LED device. For example, first output current $I_1$ can be less than about 1 mA, and reference voltage $V_{ref1}$ can be set to be in a range of from about 0.1V to about 10V. If the driving voltage $V_{LED}$ is 120V, peak value Vpk of the DC bus voltage $V_{bus}$ is about 240V, and driving current $I_{LED}$ is about 100 mA, for the LED driver using linear regulator shown in FIG. 1A, the efficiency can be obtained from equation (1):

$$\eta_1 = \frac{V_{LED}}{V_{bus}} = 50\% \qquad (1)$$

However, for the example LED driver shown in FIG. 2A, if reference voltage $V_{ref1}$ is about 2.4V, driving current $I_{LED}$ can be shown in equation (2):

$$\frac{I_2 \times (2 \times t_1)}{T/2} + \frac{I_1 \times t_2}{T/2} = I_{LED} \qquad (2)$$

Also, to simplify the efficiency estimate, if first output current $I_1$ is far less than second output current $I_2$, equation (2) can be changed as an approximation into equation (3):

$$\frac{4 \times I_2 \times t_1}{T} \approx I_{LED} \qquad (3)$$

Input power $P_{in}$ can therefore be obtained from equation (4):

$$P_{in} = \frac{4 \times I_2 \times t_1}{T} \times \left( V_{LED} + \frac{V_{ref1}}{2} \right) = I_{LED} \times \left( V_{LED} + \frac{V_{ref1}}{2} \right) \qquad (4)$$

In addition, the operating efficiency of this example LED driver can be obtained as shown below in equation (5):

$$\eta_2 = \frac{V_{LED} \times I_{LED}}{P_{in}} = \frac{V_{LED}}{V_{LED} + V_{ref1}/2} \approx 99\% \qquad (5)$$

Because reference voltage $V_{ref1}$ may be far less than driving voltage $V_{LED}$, the operating efficiency can be close to 100%. Thus, this particular example regulator can achieve much higher efficiency than the traditional linear regulator discussed above.

Figure 3A:
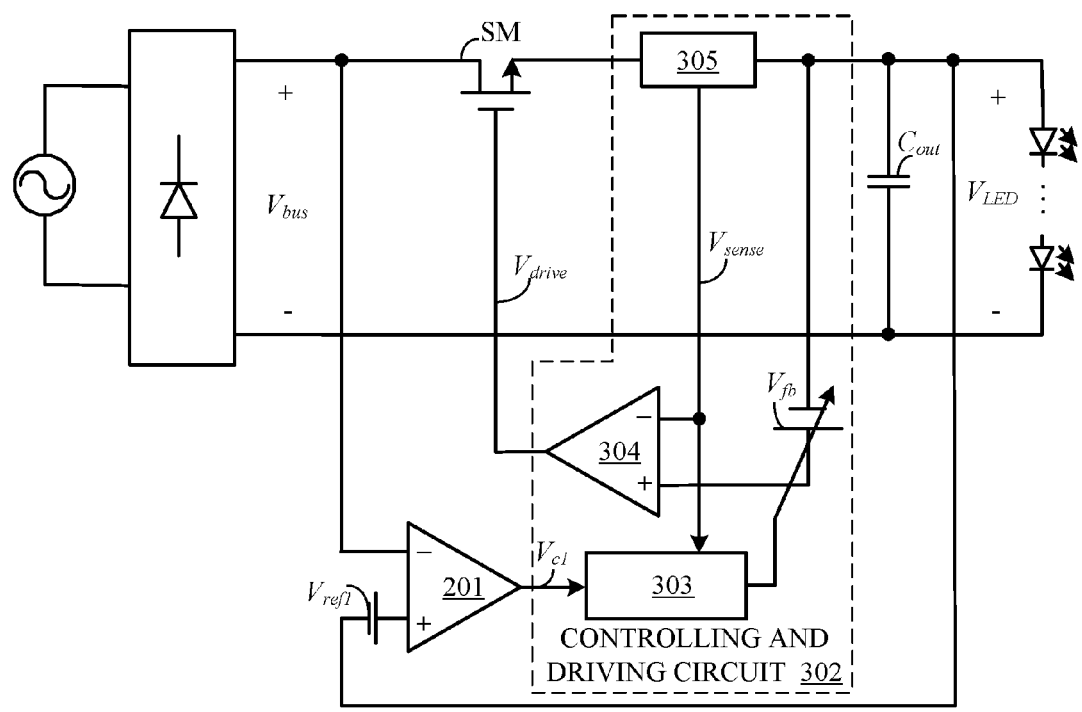
FIG. 3A is a schematic diagram of a second example high efficiency LED driver in accordance with embodiments of the present invention.

With reference to FIG. 3A, shown is a schematic diagram of a second example high efficiency LED driver in accordance with embodiments of the present invention. This example LED driver can include controlling and driving circuit 302 with feedback controller 303, error amplifier 304, and detector 305. Detector 305 can be coupled between the second terminal of power switch SM and the first terminal of output capacitor $C_{out}$. Feedback controller 303 can receive first control signal $V_{c1}$ from comparator 201, and can also receive LED current sampling signal $V_{sense}$, and may generate an adjustable feedback voltage $V_{fb}$. Error amplifier 304 can receive LED current sampling signal $V_{sense}$ and feedback voltage $V_{fb}$.

And operating process can be as described below. When DC bus voltage $V_{bus}$ is greater than driving voltage $V_{LED}$ and less than the sum of driving voltage $V_{LED}$ and reference voltage $V_{ref1}$ first controlling signal $V_{c1}$ can be at high level. Also, feedback controller 303 can output a fixed feedback voltage signal $V_{fb}$, error amplifier 304 can generate driving signal $V_{drive}$ for power switch SM according to LED current sampling signal $V_{sense}$ and feedback voltage signal $V_{fb}$, and power switch SM can output a substantially constant second output current $I_2$. Under this condition, because the conductive voltage drop of power switch SM may be relatively small, the power losses may also be relatively small.

When DC bus voltage $V_{bus}$ is greater than the sum of driving voltage $V_{LED}$ and reference voltage $V_{ref1}$, first controlling signal $V_{c1}$ can be at low level, and feedback controller 303 can output feedback voltage signal $V_{fb}$ according to LED current sampling signal $V_{sense}$. Also, error amplifier 304 can generate driving signal $V_{drive}$ for power switch SM according to LED current sampling signal $V_{sense}$ and feedback voltage signal $V_{fb}$, and power switch SM can output first output current $I_1$. Under this condition, although the input voltage is relative high, the power losses may be relatively small because first output current $I_1$ is relatively small.

The average value of first output current $I_1$ and second output current $I_2$ can be set to match with the corresponding driving current of the LED device. In order to obtain higher efficiency, first output current $I_1$ can set to be less than about 1% of the driving current of the LED device. For example, first output current $I_1$ can be less than about 1 mA, which may be far less than second output current $I_2$. Also, reference voltage can set to be in a range of from about 0.1V to about 10V.

In the example LED driver shown as FIG. 3A, detector 305 can be implemented by resisters or other components or circuit blocks with the same or a similar function. Power switch SM can be implemented by a MOSFET transistor or any other appropriate transistor. Feedback controller 303 can be any other appropriate controller. People skilled in the art will also recognize that feedback controller 303 can include a wave-shaping circuit to lower the harmonic content of the input signal.

Figure 3B:
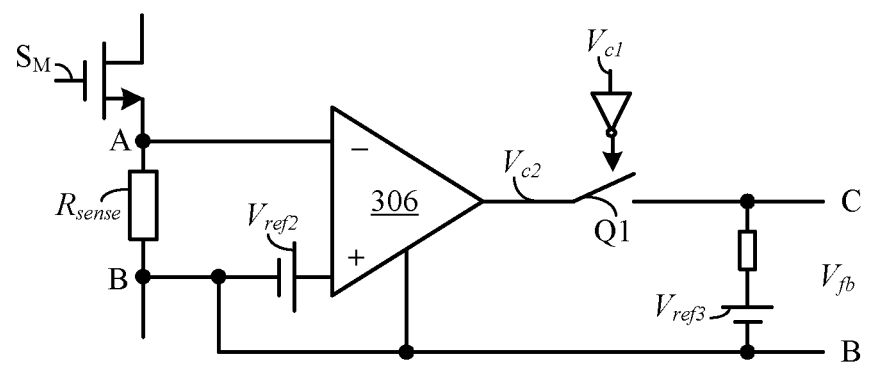
FIG. 3B is a schematic diagram of an example feedback controller in the high efficiency LED driver shown in FIG. 3A.

With reference to FIG. 3B, shown is a schematic diagram of an example feedback controller in the high efficiency LED driver shown in FIG. 3A. In this example, detector 305 can be implemented by sampling resistor $R_{sense}$. Feedback controller 303 can include error amplifier 306, switch Q1, reference voltage $V_{ref2}$, and reference voltage $V_{ref3}$.

Error amplifier 306 can connect to terminal A of detecting resistor $R_{sense}$ at its inverting terminal, and can be used to receive the sum of the voltage at point B and reference voltage $V_{ref2}$ at its non-inverting terminal. Reference voltage $V_{ref2}$ can be used to represent the corresponding driving current. Error amplifier 306 can be used to generate second controlling signal $V_{c2}$ by amplifying the error between the product voltage ($I_{LED} \times R_{sense}$) and reference voltage $V_{ref2}$. Thus, second controlling signal $V_{c2}$ can represent an error between the detected driving current $I_{LED}$ and a corresponding driving current.

Switch Q1 can connect to the output terminal of error amplifier 306 at its first terminal. The state of switch Q1 can be controlled by the inverted signal of first controlling signal $V_{c1}$. Reference voltage $V_{ref3}$ can connect between terminal C and terminal B, or be series connected with a resistor between terminal C and terminal B.

One example operating process of this example feedback controller can be described as follows. When DC bus voltage $V_{bus}$ is greater than driving voltage $V_{LED}$ and less than the sum of driving voltage $V_{LED}$ and reference voltage $V_{ref1}$, first controlling signal $V_{c1}$ can be at high level. At the same time, switch Q1 can be turned off, reference voltage $V_{ref3}$ can be configured as feedback voltage signal $V_{fb}$, and error amplifier 304 can generate driving signal $V_{drive}$ for power switch SM according to LED current sampling signal $V_{sense}$ and feedback voltage signal $V_{fb}$ (reference voltage $V_{ref3}$). Under this condition, the output current of power switch SM can be the second output current $I_2$ as shown in equation (6):

$$I_2 = \frac{V_{ref3}}{R_{sense}} \quad (6)$$

When DC bus voltage $V_{bus}$ is greater than the sum of driving voltage $V_{LED}$ and reference voltage $V_{ref1}$, first controlling signal $V_{c1}$ can be at a low level. At the same time, switch Q1 can be turned on, second controlling signal $V_{c2}$ can be configured as feedback voltage signal $V_{fb}$, and error amplifier 304 can generate driving signal $V_{drive}$ for power switch SM according to LED current sampling signal $V_{sense}$ and feedback voltage signal $V_{fb}$ (controlling signal $V_{c2}$). Under this condition, the output current of power switch SM can be first output current $I_1$ as shown in equation (7):

$$I_1 = \frac{V_{c2}}{R_{sense}} \quad (7)$$

First output current $I_1$ can be regulated according to second controlling signal $V_{c2}$ to ensure that the average of first output current $I_1$ and second output current $I_2$ substantially matches the corresponding driving current $I_{LED}$.

Figure 4:
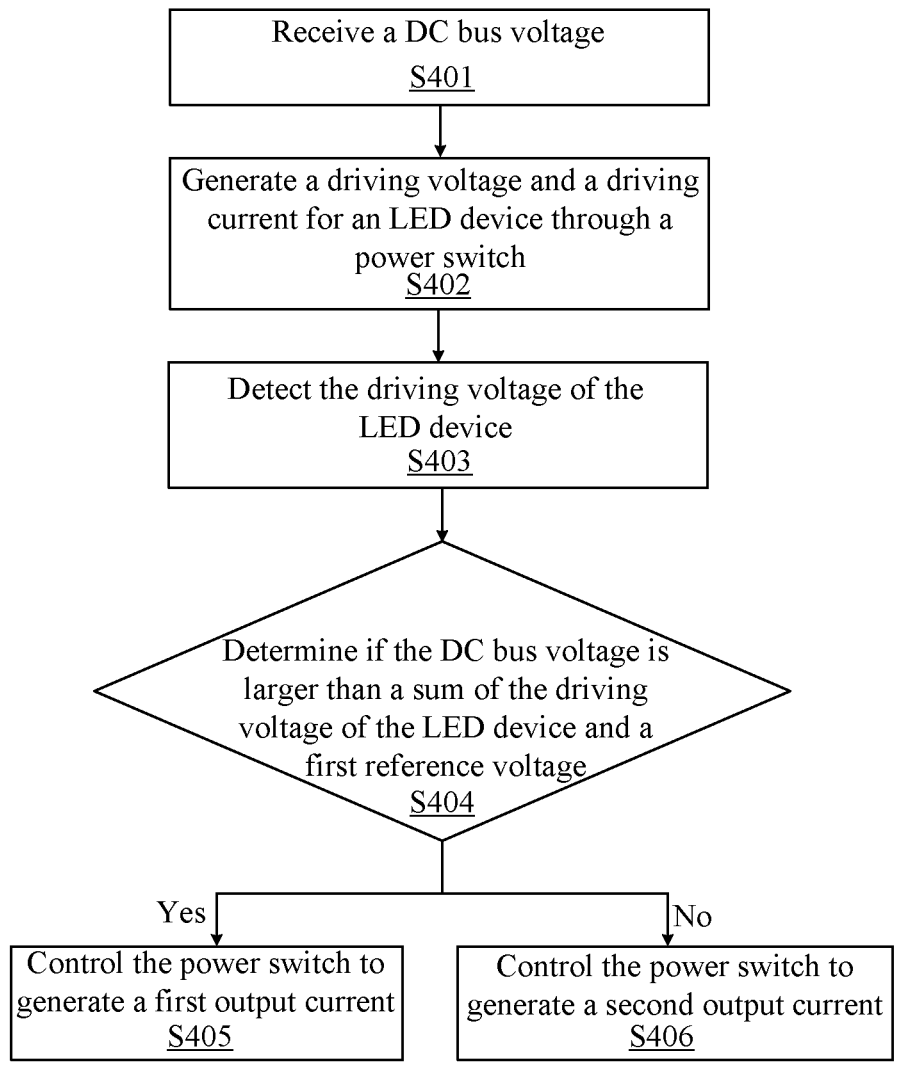
FIG. 4 is a flow diagram of an example high efficiency LED driving method in accordance with embodiments of the present invention.

The following will describe an example high efficiency LED driving method according to embodiments of the present invention, in conjunction with FIG. 4. In this example, the LED driving method can include receiving a DC bus voltage at S401. The DC bus voltage can be obtained by rectifying an AC input voltage at S402, rate a driving voltage and a driving current for an LED device can be generated through a power switch. At S403, the driving voltage can be detected.

At S404, the DC bus voltage can be compared against the sum of the driving voltage and a first reference voltage. At S405, when the DC bus voltage is greater than the sum of the driving voltage and the first reference voltage, the power switch can be controlled to generate a first output current. At S406, when DC bus voltage is greater than the driving voltage but less than the sum of the driving voltage and the first reference voltage, the power switch can be controlled to generate a second output current.

The average current of the first output current and the second output current can be set to substantially match with the driving current of the LED device. Also, the generating of the first output current can include: detecting the output current of the power switch to obtain an average current; comparing the average current against a reference current to obtain an error controlling signal; and where when DC bus voltage is greater than the sum of the driving voltage and the first reference voltage, the power switch can generate the first output current according to the error controlling signal.

With the above-described LED driving method, when the DC bus voltage is relatively small, the power switch may have a minimum voltage drop, and the output current of the power switch can be maintained as substantially constant. When DC bus voltage is relatively large, the output current of the power switch can be adjusted to satisfy the optimized minimum driving current. Therefore, the efficiency of the LED driver utilizing such a LED driving method can be much higher than an LED driver with a linear regulator.

In order to obtain higher efficiency, the first output current can be set to be less than about 1% of the driving current of the LED device. For example, the first output current can be less than about 1 mA, and the first reference voltage can be in a range of from about 0.1V to about 10V. Because the first reference voltage may be much less than the driving voltage, the operating efficiency can be about 100%, which is much higher than the LED driver with a traditional LED driving method.

It can be concluded that, with the example high efficiency LED driver and driving method as described herein, the output current can be adjusted according to the relationship of the input voltage and the driving voltage. When the input voltage is relatively high, the output current can be minimized to satisfy the driving requirement. When input voltage is relatively small, the conduction voltage drop can be reduced while the output current can be relatively high. In both conditions, the power losses can be reduced to achieve higher operating efficiency. Also, the circuit structure can be simplified to lower overall product costs and circuit size.

The above described particular example LED drivers and driving methods in accordance with embodiments of the present invention. As people skilled in the art will recognize, any other appropriate circuit structures, methods, and/or components can also be utilized in particular embodiments.

The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A light-emitting diode (LED) driver, comprising:
    a) a power switch configured to receive a DC bus voltage, and to generate a driving voltage and a driving current for an LED device;
    b) a first comparator configured to generate a first controlling signal by comparison of said DC bus voltage against a sum of said driving voltage and a first reference voltage;
    c) a controlling and driving circuit configured to receive said first controlling signal and an LED current sampling signal, wherein said controlling and driving circuit is configured to operate in a first operation mode or a second operation mode according to said first controlling signal;
    d) wherein when said DC bus voltage is greater than said sum of said driving voltage and said first reference voltage, said controlling and driving circuit is configured to operate in said first operation mode, and said power switch is configured to generate a first output current according to said LED current sampling signal;
    e) wherein when said DC bus voltage is greater than said driving voltage and less than said sum of said driving voltage and said first reference voltage, said controlling and driving circuit is configured to operate in said second operation mode, and said power switch is configured to generate a second output current; and
    f) an output capacitor coupled in parallel with said LED device, and having a first terminal coupled to said DC bus voltage, and a second terminal coupled to said power switch.

2. The LED driver of claim 1, wherein said controlling and driving circuit comprises:
    a) a detector coupled between said power switch and said LED device, wherein said detector is configured to detect an output current of said power switch;
    b) a feedback controller coupled to said detector and said first comparator, wherein said feedback controller is configured to generate a feedback voltage signal according to said LED current sampling signal and said first controlling signal;

c) wherein when said DC bus voltage is greater than said driving voltage and less than said sum of said driving voltage and said first reference voltage, said feedback voltage signal is substantially equal to a second output voltage;

d) wherein when said DC bus voltage is greater than said sum of said driving voltage and said first reference voltage, said feedback voltage signal is substantially equal to a first output voltage; and e) a driving circuit configured to receive said feedback voltage signal and said LED current sampling signal, and to drive said power switch to generate said first output current and said second output current.

3. The LED driver of claim 2, wherein said feedback controller comprises:

a) an error amplifier configured to receive an average value of an output current of said power switch and a second reference voltage, and to generate a second controlling signal, wherein said second reference voltage represents a corresponding driving current of said LED driver;

b) a switch coupled to an output of said error amplifier to receive said second controlling signal, wherein a state of said switch is configured to be controlled by said first controlling signal;

c) wherein during said first operation mode, said first controlling signal is configured to turn on said switch, and said feedback voltage signal is substantially equal to said second controlling signal and is configured to operate as said first output voltage; and d) wherein during said second operation mode, said first controlling signal is configured to turn off said switch, and said feedback voltage signal is substantially equal to said third reference signal and is configured to operate as said second output voltage.

4. The LED driver of claim 1, wherein:

a) said first output current is adjustable to maintain a first average current of said first output current and said second output current to match a corresponding driving current of said LED device; and b) said first output current is less than about 1% of said corresponding driving current of said LED device.

5. The LED driver of claim 1, wherein said second output current is a substantially constant value.

6. The LED driver of claim 2, wherein said first output voltage is a substantially constant value.

7. The LED driver of claim 2, wherein said first output voltage is a variable value.

8. The LED driver of claim 2, wherein said second output voltage is a substantially constant value.

* * * * *